United States Patent [19]

Kirn et al.

[11] Patent Number: 4,710,391
[45] Date of Patent: Dec. 1, 1987

[54] FLAVORING METHOD FOR FRIED FOOD PRODUCTS

[75] Inventors: Jeffrey F. Kirn, Godfrey, Ill.; James M. Connaughton, Jr., Cincinnati, Ohio

[73] Assignee: Conagra, Inc., Omaha, Nebr.

[21] Appl. No.: 743,501

[22] Filed: Jun. 11, 1985

[51] Int. Cl.⁴ ................................................. A23L 1/22
[52] U.S. Cl. .................................... 426/289; 426/438; 426/96; 426/99; 426/281; 426/533; 426/291; 426/651; 426/650; 426/417; 426/92; 426/94; 426/102; 426/302; 426/89; 426/293
[58] Field of Search ............... 426/438, 96, 99, 281, 426/533, 291, 651, 650, 417, 92, 94, 102, 302, 89, 289, 293

[56] References Cited

U.S. PATENT DOCUMENTS

| | | | |
|---|---|---|---|
| 3,809,777 | 5/1974 | Thompson | 426/438 |
| 3,867,556 | 2/1975 | Darragh et al. | 426/99 X |
| 3,906,116 | 9/1975 | Quesnel et al. | 426/651 X |
| 3,997,683 | 12/1976 | Schnell . | |
| 4,228,278 | 10/1980 | Shu et al. . | |
| 4,276,312 | 6/1981 | Merritt | 426/96 |
| 4,384,008 | 5/1983 | Millisor . | |
| 4,386,559 | 6/1983 | El-Hag et al. | 426/438 X |

OTHER PUBLICATIONS

Pruthi, Spices and Condiments: Chemistry, Microbiology, Technology, 1980, Academic Press: New York, pp. 247-248.
Whistler et al, Industrial Gums, 1959, Academic Press: New York, p. 265.

Primary Examiner—Joseph Golian
Attorney, Agent, or Firm—Willian Brinks Olds Hofer Gilson & Lione Ltd.

[57] ABSTRACT

A process is disclosed wherein a flavoring agent used to flavor fried foods products is encapsulated so that the flavoring agent may be easily removed from oil used to fry the food products. In the preferred embodiment of the invention, the encapsulated material is further coated with a flavor modifying agent and a high melting point fat which helps to protect the encapsulant from water and from physical damage prior to and during frying, and to modify the flavor of the oleoresin capsicum flavoring agent used.

12 Claims, No Drawings

FLAVORING METHOD FOR FRIED FOOD PRODUCTS

BACKGROUND OF THE INVENTION

The present invention relates to a method of flavoring fried foods and products resulting therefrom. Specifically, the invention is directed to the use of encapsulated flavoring agents, such as spices, to flavor fried foods.

It is often desirable when preparing food products to add flavoring agents such as spices. In the context of fried food the flavoring agents are either applied directly to the surface of the food, or incorporated in a batter or breading applied to the product before frying. As an alternative, the flavoring may be incorporated internally in the product; such as by being mixed with ingredients which are later formed into distinct food products before frying, or by injection into solid food products to be fried.

A common problem with frying food products is that the oil used for frying becomes contaminated with material from the products being fried. Filtration of the oil is useful to remove particles large enough to be retained by the filter, but smaller particles, or especially material dissolved in the oil, are very difficult to remove. Sometimes, of course, removal is not necessary if foods fried subsequently are not detrimentally affected by the contamination in the oil. However, if the material degrades after a time in the hot oil, or if a different product is to be fried in the oil which would be detrimentally affected by the presence of the material, removal is required. In many instances it may be less expensive to discard the oil than to remove the contamination.

One material that is commonly used for flavoring foods is oleoresin capsicum, hereinafter "ORC". ORC is the hot, oil portion of red pepper. To obtain a hot and spicy flavor in a product such as fried chicken, ground red pepper could be sprinkled on the surface of the chicken, injected along with a water solution into the chicken, or added to the breading material applied to the outside of the chicken. It has been found, however, that the ORC in the red pepper thus applied to the chicken is leached into the oil during the frying process, and is not removed by regular filtration methods. In the case of the injected red pepper, it is speculated that the water which comes out of the chicken during frying carries the ORC with it, and the ORC remains in the oil. Besides being dissolved in the oil during the frying process, a significant amount of ORC is released into the atmosphere, making it nearly impossible for personnel to work around the frying equipment without protective apparatus.

Because ORC is not removed during filtration, chicken subsequently fried in the same oil picks up ORC with the oil absorbed by the chicken during the frying operation. With the level of ORC left behind after frying a hot flavored chicken product, the regular flavor fried chicken picks up a noticeable hot flavor. One solution would be to use the oil to fry only hot flavored chicken. The cost of equipment for such a dedicated fryer system is quite high, however, and the aforementioned safety problems still exist. In addition, with time, the ORC in the hot oil degrades. Also, the level of hot flavor in each batch of chicken would be different, depending on the amount of ORC in the oil, which in turn would depend on the previous number of batches of hot flavored chicken fried in the oil.

SUMMARY OF THE INVENTION

The present invention is directed to a method of flavoring fried food products using an encapsulated flavoring agent, and the products themselves. By encapsulating the flavoring agent in a suitable heat and oil resistant encapsulant, the flavoring agent does not dissolve into the frying oil and is thus more easily removed. The encapsulating material should also be impervious to water when used in flavoring food products having sufficient water to destroy the encapsulant before the end of frying. In a preferred embodiment, the particle size of the encapsulated material is large enough to be removed by normal filtration methods.

In a further preferred embodiment, the encapsulated flavoring agent is coated with a flavor modifying agent. It has been found that this extra coating, as well as modifying the flavor, helps to keep the flavoring agent encapsulated.

A primary advantage of the present invention is that material which would normally contaminate the oil may thus be easily removed, and other products can be fried in the oil without picking up objectionable flavors.

Another advantage of the present invention is that pungent flavors, such as ORC, can be fried in open equipment without the need for personnel working in the vicinity to wear protective apparatus.

Another advantage is that the encapsulated flavoring agent can be removed from the oil before it degrades.

Another advantage of the present invention is that a flavor modifying agent can be used in conjunction with the encapsulated flavoring agent, producing better encapsulation and a more desirable flavor and "mouthfeel."

Further advantages and additional features of the present invention will best be understood from the following detailed description.

DETAILED DESCRIPTION OF THE PRESENTLY PREFERRED EMBODIMENTS OF THE INVENTION

The method of the present invention may be used with a wide variety of food products. For ease of discussion, the preferred embodiment of the invention will be described in terms of flavoring fried chicken parts with a hot and spicy flavor.

I. The Novel Encapsulated Flavor Product

In the presently preferred embodiment, the encapsulated flavoring agent comprises an encapsulated ORC material, coated by a flavor modifying agent, which in turn is covered by a high melting point fat.

The encapsulated ORC material may be made from a blend of high and low quality ORC. For example, a 50-50 blend of 500,000 Scoville heat unit and 1,000,000 Scoville heat unit ORC liquids may be combined. (Unless otherwise specified, all percentages and ratios herein are on a weight basis.) In the preferred embodiment, from 12-18% ORC blend is mixed with 30-40% gum arabic and 40-60% modified food starch. Most preferably 15% ORC, 35% gum arabic and 50% modified food starch are used.

This combined material is next mixed with about an equal amount of water to form an emulsion. The amount of water needed will vary depending on various conditions, such as the relative humidity, etc., but is determinable using ordinary skill in the art.

For a discussion of encapsulating flavoring agents in general, see U.S. Pat. No. 4,276,312 to Merritt. The emulsion is put through a spray dryer at a temperature of about 140°–160° F. and at a rate of 100–200 pounds/hour. Air enters the spray dryer at 280°–350° F. and leaves at 130°–160° F. The emulsion forms hard particles with less than 3% moisture and less than 1% volatile surface oil content. The particles are of a size so that 100% pass through a 40 mesh screen. A multi-stage drying type spray dryer from Niro Atomizer, Gladsaxevej, 305, DK-2860, Soeberg, Denmark is a suitable spray dryer.

The resulting encapsulated product may be used as is by mixing with or injection into the food product to be flavored, or by being mixed with other ingredients in a batter or breading coating applied before frying. (If added by injection, the orifice of the needle must be sufficiently large to allow the encapsulated material to pass through unruptured.) When fried, resulting food products have a hot flavor. The flavor is released as the encapsulant is broken during mastication.

In the case of ORC encapsulated material, the hot flavor may be too harsh for many people, therefore a flavor modifying agent may be added.

The preferred flavor modifying agent is Natural Chicken Flavor Paste #W3367 from Fries & Fries—The Flavormakers, 110 E. 70th Street, Cincinnati, Ohio 45216. This paste comprises cooked chicken skins, enzyme modified cheese and amino acid, prepared as follows.

A mixture of 95% by weight ground chicken skins and 5% by weight enzyme modified cheese are placed in a 200 gallon scraped surface, steam jacketed vessel. The ground chicken skins and enzyme modified cheese are agitated and heated slowly to 225° F. over a 4 hour period of time so that the skins are not burned. At 225° F., about 1% by weight amino acids, preferably 0.5% by weight of alanine and 0.5% cysteine are added to the mixture. The resulting mixture is then heated to about 300° F. for about 4 hours to develop the desired flavor. After this period of time, the moisture content of the resulting mixture is checked to determine whether it is less than about 0.5% by weight. Upon reaching the 0.5% by weight minimum moisture level, the mixture is allowed to cool. Upon cooling to room temperature, 0.1% by weight of BHA is dispersed in the cooled mixture. The resultant chicken flavored mixture is then agitated to develop a paste-like consistency.

The paste is refrigerated to make it solid, and is then blended with a typical wheat flour at a 50-50 weight ratio. A suitable mixer for this blending is the 300 liter capacity horizontal mixer, model FKM 300D from Littleford Brothers Inc., Florence, KY. The paste material is cut into the flour much like cutting shortening into flour when making pastry crust. The mixing takes from 1 to 2 hours, during which time the material heats up to a temperature of about 110° F., at which temperature its consistency is suitable for coating the encapsulated ORC.

At this point, the mixer is slowed to half speed and the encapsulated ORC is mixed in at a weight ratio of about 1 part paste/flour to about 3 parts encapsulated ORC. Mixing takes approximately 15 minutes, during which time the material cools to about 80°–90° F. and the paste/flour mixture coats the encapsulated ORC.

During frying, the flavor modifying agent disintegrates somewhat and comes off the encapsulated ORC. When the coated encapsulated ORC is used in a breading or batter coating, however, this flavoring material which disintegrates is partially absorbed by the breading or batter. The effect of this flavor modifying agent is to improve the organoleptic properties of the results fried food when using the encapsulated ORC. It also provides better "mouth feel" in the final product.

In the preferred embodiment, this coated, encapsulated material is next coated with a high melting point fat. Melted stearine at a temperature of about 180° is sprayed over the coated encapsulated ORC using a conventional spray atomizer. A suitable stearine material in flake form is Sterotex-AM from Capital City Products Co., P.O. Box 569, Columbus, OH with a Wiley melting point of 152°–157° F. A weight ratio of about 1 part stearine to 10 parts coated, encapsulated ORC is used. The spraying is conducted while the mixing continues for approximately 10-15 minutes.

The result is a layer of stearine around the coating of flavor modifying agent, which in turn surrounds the encapsulated ORC. The material is further allowed to cool, making a fat coated particle. This layer of fat also helps to encapsulate the spice. During frying the fat melts, but provides additional time before the flavor modifying agent is exposed to the hot oil. If desired, about 0.1 to 0.2% tricalcium phosphate can be added at this point to increase the free-flowing nature of this novel encapsulated flavor product. This novel flavor product is stable during room temperature storage in poly-lined fiber drums for six months.

II. Method of Using the Encapsulated Flavor Product

The preferred method of using the above flavor product to flavor fried chicken is as follows.

Raw chicken is cut up and injected with a solution of 85 to 100% water, 0 to 10% phosphate and 0 to 5% salt. The most preferred solution comprises 93% water, 5% sodium tripolyphosphate and 2% sodium chloride. The weight ratio of chicken to solution is from 15:1 to 7:1, most preferably 9:1.

The injected raw chicken is pre-dusted with a composition of 80–95% flour, 0–10% salt and 0–10% spices. Most preferably the predust comprises 90% flour, 7% salt and 3% spices. From about 3 to 5 pounds of predust are used per 70 pounds of raw, injected chicken.

The predusted chicken is next coated with a batter comprising a dry mix of 86 to 95% flour, 0 to 10% salt, 0 to 2% dry whole eggs and 0 to 2% dry whey. Most preferably the dry ingredients are mixed first at a weight ratio of 90% flour, 9% salt and 1% dry eggs, and later mixed with water at a weight ratio of about 1:3 dry material to water. From about 10 to 12 pounds of batter are used to cover the 70 pounds of chicken previously predusted.

The battered chicken is next coated with a breading mix comprising 70–95% flour, 0–10% salt, 0–7% spices and 1–10% of the novel encapsulated flavor product produced in part I. above. The preferred composition of the breading is 80.7% flour, 8.1% salt, 3.2% spices and 8.0% novel encapsulated flavor product. From about 13 to 17 pounds of breading coats the 70 pounds of chicken predusted and battered.

The breaded chicken parts are fried in hydrogenated vegetable oil in a deep fat fryer at a temperature of about 330°–390° F. The preferred temperature is 360° F. Frying is continued until the chicken parts reach at least minimum internal doneness as specified by the USDA, 165° F. for white meat and 180° F. for dark meat.

The following examples serve to illustrate the invention and should not be construed as limiting the scope of invention.

EXAMPLE I

Fried Bone-in Chicken

1. A breading mix was prepared as follows:

| Flour | 80.7% |
|---|---|
| Salt | 8.1% |
| Spices | 3.2% |
| Novel Flavor Product | 8.0% |
| | 100.0% |

The ingredients were placed in a standard ribbon blender and uniformly mixed. This mix was then transferred to the fried chicken processing line and used as the final breading on the fried chicken.

2. A pre-dust mix was prepared consisting of:

| Flour | 90.0% |
|---|---|
| Salt | 7.0% |
| Spices (typical poultry spices) | 3.0% |
| | 100.0% |

This product was blended in a similar fashion as the breading.

3. A batter was prepared consisting of a dry blend of:

| Flour | 90.0% |
|---|---|
| Salt | 9.0% |
| Eggs, dry whole solids | 1.0% |
| | 100.0% |

The batter dry mix was blended in a standard ribbon blender. The final batter was blended in a kettle or blender using high speed agitation by slurrying the dry mix into water at a total ratio of 70% water and 30% dry mix. The resulting solution was pumped to the batter machines on the processing line.

4. Raw chicken was cut-up and injected with a solution comprising:

| Water | 93.0% |
|---|---|
| Phosphate (Sodium tripolyphosphate) | 5.0% |
| Salt | 2.0% |
| | 100.0% |

5. These injected chicken parts were then pre-dusted, battered, breaded and fried in hydrogenated soy oil in a deep fat fryer at 360° F. to a minimum internal doneness of 165° F. for white meat and 180° F. for dark meat.

During frying, the frying oil was continuously filtered through a standard catch box and filter paper system. Two types of filter paper were used, with four sections total, one thin section and three heavy sections. The thin paper (0.008 in. caliper) had a rapidity rating of $650 \pm 100$ cm$^3$/min./3.14 in.$^2$ paper at 2 in. H$_2$O. The heavy paper (0.038 in. caliper) had a rapidity rating of $425 \pm 50$. Also, oil was picked up by chicken, and fresh oil was added to the system. As a result, the level of ORC in the oil eventually reached in equilibrium level.

At the end of frying the oil was again filtered. The oil was then reused the following day for production of regular flavored product. The amount of ORC picked up by the regular product was below the threshold level of flavor for the hot spice. Thus, substantially all of the ORC remained encapsulated during frying and was removed by paper filtration of the oil.

The frozen fried chicken product upon reconstitution in an oven was hot and spicy in flavor and had a very pleasant well rounded mouthfeel. It had no bitterness or harshness from the hot spice and the flavor impact of the spice was uniform throughout the breading of the product.

EXAMPLE II

Crumb Type Breading

A pre-dust, batter, and breading were prepared and used as in Example I except that an equal amount of crumb type breading, the breading sold under the trademark "Golden Dipt 43-23,", was used to replace the flour in the breading. The resulting fried chicken product had a flavor and mouthfeel of equal quality to the product of Example I.

EXAMPLE III

Boneless Fried Chicken Product

A comminuted meat mix of natural proportion chicken meat (white meat, dark meat and skin) was blended with salt, spices and the novel flavor product in a blender.

| White Chicken Meat | 45.0% |
|---|---|
| Dark Chicken Meat | 42.75% |
| Chicken Skin | 10.0% |
| Salt | .5% |
| Spices | .75% |
| Novel Flavor Product | 1.00% |
| | 100.00% |

This product was then formed into the shape of a chicken wing using a Formax forming machine. The product was then pre-dusted, battered, breaded, fried, cooled, frozen and packaged as in Example II except that the crumb breading was made using only 4% of the novel flavor product and 84.7% of a breading crumb sold under the trademark "Golden Dipt 43-23".

The resulting product upon reconstitution in an oven had a good well rounded hot and spicy flavor throughout.

Once again the frying oil was not fouled in any way and regular production could be fried in this oil after filtering, as in Example I, with no concern about changing the quality of regular flavored products.

While the invention has been described in terms of its preferred embodiment, it should be understood that various changes and modifications may be made without departing from the scope of the present invention.

For example, frying in oil is quite common, but shortening as well is often used. Thus, as used herein, the term "oil" refers to fats in general which are suitable for frying food products. Other oils which are useful in practicing the invention include palm oil, cottonseed oil, coconut oil, peanut oil and mixture thereof.

Examples of other fried foods, especially frozen prepared fried foods, to which the invention is applicable include breaded fish, shrimp or other seafood; breaded bone-in or boneless red meat items, such as steak or pork nuggets, fingers, etc.; battered and breaded cheese nuggets, sticks, etc. and battered and breaded vegetable nuggets, sticks, etc.

This invention also applies to refrigerated items such as raw patties, battered, breaded and refrigerated until cooked in home fryers or food service systems.

Oil-impervious heat resistant encapsulating agents other than gum arabic and modified food starch may be used, such as maltodextrin, dextrines in general, starches in general and other common encapsulating materials. However, gum arabic is preferred when producing a fried chicken product because dextrin encapsulation resulted in surface spots that were undesirable on the fried chicken product.

Besides being mixed with the breading, the novel flavoring product may be added to the predust and/or batter formulations. One advantage of the preferred embodiment of the invention is that water, such as that present in a batter coating, is not able to penetrate the fat coating or the flavor modifying paste coating to attack the encapsulant. In applications where the flavoring agent needs no flavor modification, the fat coating could still be applied to prevent water from dissolving the encapsulating material, or a water impervious, as well as oil impervious, encapsulating material could be used.

The strength of ORC in the final product can be modified to achieve a desired flavor in the fried food product. Also, the level of flavor product used in the breading or batter can be adjusted. The strength of the ORC liquid used for encapsulation is an important consideration in this regard, more ORC liquid being required the less pungent the ORC is. A high concentration of ORC in the encapsulated material, such as in the preferred embodiment, makes it possible to use a smaller amount of the novel flavoring product in the breading mixture, reducing cost and avoiding major modification of the breading composition.

The invention is applicable to other flavors or spices which would be detrimental in frying oil either due to degradation or due to the undesirability of the flavors being picked up by subsequently fried foods. Some examples include barbecue flavors, sweet flavors and pungent spices, etc.

The invention is also useful in situations in which frying is used to set the batter but only partially cook the food product, with final cooking being accomplished by baking or other means.

Because these and other modifications may be made without departing from the present invention, the scope of the invention is defined by the appended claims.

We claim:

1. A method of flavoring food products comprising the steps of:
    (a) encapsulating an oil-soluble flavoring agent with an edible, oil impervious, heat resistant, gum arabic encapsulating material;
    (b) coating said encapsulated flavoring agent with a flavor modifying agent comprising cooked chicken skins, enzyme modified cheese, amino acid and wheat flour;
    (c) adding the resulting coated, encapsulated flavoring agent to a food product; and
    (d) frying said food product.

2. The method of claim 1 wherein the food product comprises a poultry product and the flavoring agent comprises a hot and spicy flavor.

3. The method of claim 2 wherein the coated, encapsulated flavoring agent is added to the poultry product by adding the coated, encapsulated flavoring agent to a breading mix which is used to coat the poultry product before frying.

4. The method of claim 3 wherein the coated, encapsulated flavoring agent comprises 1-10% of the breading mix.

5. The method of claim 2 further comprising the step of coating the poultry product with batter before frying and wherein the poultry product is fried for a sufficient time to set the batter and is thereafter baked.

6. The method of claim 1 wherein the heat resistant encapsulating material comprises gum arabic and modified food starch.

7. The method of claim 1 further comprising the step of coating the coated, encapsulated flavoring agent with a high melting point fat.

8. The method of claim 7 wherein the high melting point fat comprises stearine.

9. The method of claim 2 wherein the poultry product comprises a mechanical mixture of poultry meat and said coated, encapsulated flavoring agent is physically mixed with said meat prior to formation of individual food products.

10. The method of claim 2 wherein the encapsulated flavoring agent comprises oleoresin capsicum.

11. The method of claim 1 wherein the food product conprises a seafood, poultry, red meat, cheese or vegetable product.

12. The method of claim 1 wherein the food product comprises chicken, the flavoring agent comprises oleoresin capsicum, the encapsulating material comprises gum arabic and modified food starch, and the flavor modifying agent comprises about 47% ground chicken skins, about 2.5% enzyme modified cheese, about 0.25% analine, about 0.25% cysteine and about 50% wheat flour.

* * * * *

UNITED STATES PATENT AND TRADEMARK OFFICE
CERTIFICATE OF CORRECTION

PATENT NO. : 4,710,391
DATED : Dec. 1, 1987
INVENTOR(S) : Jeffrey F. Kirn et al.

It is certified that error appears in the above-identified patent and that said Letters Patent is hereby corrected as shown below:

IN THE SECTION ENTITLED "[73] ASSIGNEE"

Please correct the spelling of the Assignee's name from "Conagra, Inc." to --ConAgra, Inc.--.

IN THE ABSTRACT

In the second line of the Abstract, please delete "foods" and substitute therefor --food--.

IN THE DETAILED DESCRIPTION
OF THE PRESENTLY PREFERRED
EMBODIMENTS OF THE INVENTION

In column 4, line 4, please delete "results" and substitute therefor --resulting--;

In column 4, line 9, after "180°" please insert --F.--;

In column 5, line 3, before the word "invention", please insert --the--;

UNITED STATES PATENT AND TRADEMARK OFFICE
CERTIFICATE OF CORRECTION

PATENT NO. : 4,710,391

DATED : Dec. 1, 1987

INVENTOR(S) : Jeffrey F. Kirn et al.

It is certified that error appears in the above-identified patent and that said Letters Patent is hereby corrected as shown below:

In column 5, line 66, please delete "reached in" and substitute therefor --reached an--;

In column 6, line 19, please delete the comma (,) that is inside the quotation marks of "Golden Dipt 43-23,";

In column 6, line 63, please delete "mixture" and substitute therefor --mixtures--;

In column 7, line 33, after the word "regard," please insert --the--.

Signed and Sealed this

Third Day of January, 1989

Attest:

DONALD J. QUIGG

*Attesting Officer*  *Commissioner of Patents and Trademarks*